Dec. 2, 1941. E. K. CLARK ET AL 2,264,276
THERMOSTAT
Filed Aug. 17, 1938
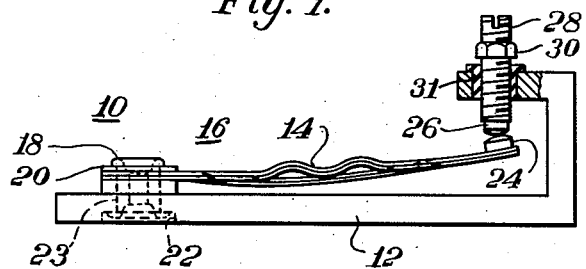
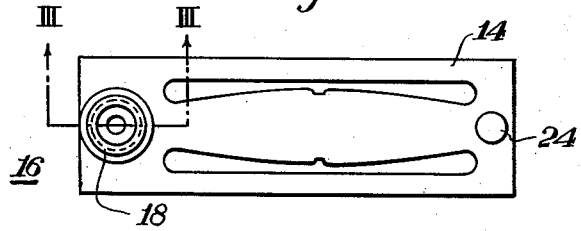
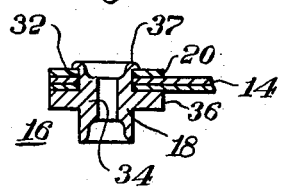 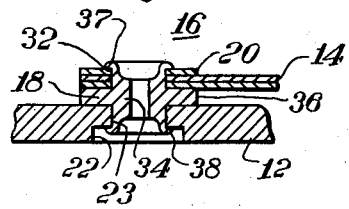
WITNESSES:
Edward Michaels
H.G. Hepler
INVENTORS
Earl K. Clark and
Paul R. Lee.
BY
W. R. Coley
ATTORNEY Patented Dec. 2, 1941

2,264,276

UNITED STATES PATENT OFFICE 2,264,276

THERMOSTAT

Earl K. Clark, West Mansfield, and Paul R. Lee, Mansfield, Ohio, assignors to Westinghouse Electric & Manufacturing Company, East Pittsburgh, Pa., a corporation of Pennsylvania Application August 17, 1938, Serial No. 225,354

1 Claim. (Cl. 297—15)

Our invention relates to bimetallic thermostats and, more particularly, to the mounting of bimetallic members in such thermostats.

During the manufacture of bimetallic thermostats it becomes necessary to heat-treat the bimetallic members thereof so that such members will operate within predetermined temperature limits. However, the bimetallic member will not operate within the given limits if it be subjected to even the slightest mechanical change after such heat-treatment. Accordingly, it is obvious that those bimetallic members capable of being mounted without effecting any mechanical changes therein, such as those members which are not rigidly attached to a support, may be satisfactorily mounted after heat-treatment; whereas those bimetallic members which cannot be mounted or attached to a thermostatic structure without producing mechanical changes within the member cannot be satisfactorily mounted after the heat-treatment thereof without materially altering the operations of such thermostat. It, therefore, follows that where it is desired to manufacture a thermostat incorporating a bimetallic member which is rigidly attached to the supporting structure when using methods now known to the art, such member must be heat-treated after being assembled in order to have such thermostat operate within a predetermined range. However, for certain manufacturing purposes, this procedure is out of the question.

It is, therefore, an object of our invention to provide a mounting for a bimetallic member which will permit the member to be heat-treated before being rigidly attached to the supporting structure, and will also permit the member to be thereafter rigidly attached to the structure without effecting the slightest mechanical change therein.

A further object of our invention is to provide a method for rigidly attaching a contact to a bimetallic member without altering or effecting a mechanical change in the member.

Another object of our invention is to provide a mounting bushing for a bimetallic member which may be rigidly attached to the member before heat-treatment thereof and which will enable the member to be thereafter rigidly attached to a supporting structure without effecting a mechanical change in the bimetallic member.

Other objects of our invention will either be pointed out specifically in the course of the following description of one form of system embodying our invention, or will be apparent from such description.

In the accompanying drawing, Fig. 1 is a side elevational view of a thermostat embodying our invention.

Fig. 2 is a top plan view of a bimetallic element and mounting bushing embodying our invention.

Fig. 3 is an enlarged sectional view taken along the line III—III of Fig. 2; and, Fig. 4 is a partial sectional view similar to Fig. 3 showing the bimetallic element and bushing rigidly attached to the thermostatic base.

Referring to the accompanying drawing, I show a thermostat 10 including a base or supporting structure 12, a bimetallic heat responsive element 14, a mounting assembly or device 16 comprising a flanged bushing 18 for rigidly attaching the bimetallic element 14 to the supporting structure 12, and a plurality of cooperating contacts 24 and 26.

The base or supporting structure 12 is, in this instance, formed from a single piece of metal into substantially a J shape. However, it is to be understood that the supporting structure may be formed in any other desirable manner to enable it to be operatively associated with any device to which it is to respond. The base 12 is in this instance formed from a heat-conducting material to aid in the conduction of heat to the bimetallic member 14. A circular counterbore 22 is cut in the bottom of the base 12 to cooperate with an aperture 23 in the base to permit the mounting device 16 to be operatively associated therewith, as hereinafter described.

The stationary contact 26 is adjustably attached to the J portion of the supporting structure 12 by means of set screw 28. The set screw 28 is locked in position by means of a lock nut 30, and is insulated from base 12 by means of insulating bushing 31.

The bimetallic member 14 has located at one end thereof a circular aperture 32 to permit cooperation with the mounting bushing 16. The bimetallic member 14 is in this instance formed into a three-legged link having a movable contact 24 rigidly attached at one end thereof and the aperture 32 located at the other end. However, it is to be understood that the mounting device disclosed herein may be operatively associated with any desired type of heat-responsive member.

The mounting device or bushing 16 comprises in this instance, a flanged bushing 18 and a flat washer 20 (refer to Figs. 3 and 4). The bushing 18 has a main cylindrical portion 34 and a centrally disposed flange portion 36 which extends radially outward therefrom. The ends of the cylindrical portion 34 are tapered down to a substantially thinner material than that of the main portion to permit such ends to be spun or riveted over, substantially as hereinafter described. It is preferred that the bushing 18 be formed of a heat-conducting material to facilitate passage of conduction of heat from the supporting base 12 to the bimetallic member 14.

The mounting bushing 16 is rigidly attached to the bimetallic member 14 to form an integral assembly therewith by having the upper end of the cylindrical portion 34 inserted through the aperture 32 in the bimetallic member 14. The upper surface of flange 36 will then contact the lower side of bimetallic member 14, insuring a solid connection therebetween. A washer 20 is then positioned about the upper end of portion 34 and on bimetallic member 14. The upper end of the main portion 34 of the bushing 18 may then be spun over against the washer 20, rigidly retaining the bimetallic member 14 against the flange 36, substantially as shown in Figs. 3 and 4. However, if desired, the flat washer 20 may be omitted. In this way, the bushing 18 and washer 20 are tightly held against the bimetallic member 14 to form an integral structure therewith. At the same time, the presence of the washer 20 prevents the spun over portion 37 (as shown in Figs. 3 and 4) from injuring the bimetallic member 14.

This integral structure, including the mounting assembly or bushing 16 and bimetallic member 14, may then be heat treated so as to give the bimetallic member 14 its predetermined operating range, in any well known manner. It will be understood that the heat treatment of the above-described partial assembly permits the bimetallic member to be rigidly attached to a supporting structure without altering such preset characteristics.

The partial assembly may, if desired, be rigidly attached to the supporting structure before being heat treated. However, due to increased cost, impracticability of handling injury to associated parts and various other reasons, it becomes practically impossible to heat treat the bimetallic member after being finally assembled.

Accordingly, it is obvious that with those bimetallic members having characteristics which would be altered when attached to a supporting structure, such as bimetallic member 14, it becomes necessary to use an intermediate mounting structure, which will enable the bimetallic member to be heat-treated before rigidly attaching such bimetallic member to a supporting structure, such as mounting device 16.

Unless such heat treatment is employed at this time, with the partial assembly hereinabove described, before attaching the bimetallic member to the supporting base, the bimetallic member would be subjected to internal mechanical stresses which have a tendency to slightly change its shape, and, therefore, its calibration. However, inasmuch as the mounting assembly 16 is relatively small, the bimetallic member 14, including the assembly 16, may be readily heat-treated so as to be given its predetermined operating range. The mounting assembly 16, inasmuch as it is rigidly attached to the bimetallic member 14 before the said member has been heat treated, may be rigidly attached to the supporting structure 12 without effecting the slightest mechanical change in the bimetallic member or strip.

The bimetallic member 14 and mounting device 16 are rigidly attached to the supporting structure 12 by inserting the lower portion of the flanged bushing 18 through aperture 23 in base 12, whereupon the lower ends of the bushing are spun or riveted over against the base 12 within counterbore 22, as shown at 38 in Fig. 4. The flange portion 36 of the bushing 18 then rests tightly against the top surface of the base 12 and rigidly attaches the bimetallic member 14 to such base.

It is, therefore, obvious that inasmuch as the mounting device 16 is rigidly attached to the bimetallic member 14 before heat treatment thereof, such member may be rigidly attached to a suitable support structure by means of the lower end of the mounting bushing 18 without causing any mechanical change in the bimetallic member 14. This structure affords suitable rigid connection for the bimetallic member after such member has had its temperature range set by heat treatment without having such range or calibration thereof altered in any manner whatsoever.

In addition, it is obvious that the presence of the mounting bushing 18, being rigidly attached to the supporting base 12 and the bimetallic member 14, affords a direct conduction path and heat from the base 12 to the bimetallic member 14, resulting in an increased operating efficiency for the thermostat 10.

It is to be understood that, if desired, contact 24, or any other suitable operating member, may be attached to the bimetallic member 14 by means of a suitable mounting device, similar to mounting device 16, so as not to alter the characteristics of the bimetallic member 14, as hereinabove described.

Various modifications may be made in the device embodying our invention without departing from the spirit and scope thereof, and we desire, therefore, that only such limitations shall be placed thereon as are imposed by the prior art and the appended claim.

We claim as our invention:

The method of assembling snap-acting thermostats which includes the steps of rigidly fastening a snap-acting bimetal element to one end of a bushing, heat-treating the sub-assembly of bushing and bimetal element to relieve strains incurred by said fastening and thereafter rigidly fastening the other end of the bushing to a mounting base in such manner as to prevent distortion of the bimetal whereby further heat treatment of the assembled unit is eliminated.

EARL K. CLARK.
PAUL R. LEE.